United States Patent
Mihalache (10) Patent No.: US 11,011,997 B2
(45) Date of Patent: May 18, 2021

(54) PULSE WIDTH MODULATION CONTROL FOR A MULTILEVEL CONVERTER

(71) Applicant: Siemens Aktiengesellschaft, Munich (DE)

(72) Inventor: Liviu Mihalache, Valencia, PA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/756,599

(22) PCT Filed: Nov. 15, 2017

(86) PCT No.: PCT/US2017/061717
§ 371 (c)(1),
(2) Date: Apr. 16, 2020

(87) PCT Pub. No.: WO2019/098999
PCT Pub. Date: May 23, 2019

(65) Prior Publication Data
US 2020/0244183 A1   Jul. 30, 2020

(51) Int. Cl.
*H02M 7/49* (2007.01)
*H02M 1/12* (2006.01)
(Continued)

(52) U.S. Cl.
CPC ............... *H02M 7/49* (2013.01); *H02M 1/12* (2013.01); *H02M 7/5395* (2013.01); *H02M 7/53871* (2013.01)

(58) Field of Classification Search
CPC .......... H02M 5/40; H02M 5/45; H02M 5/458; H02M 5/4585; H02M 1/12; H02M 7/49; H02M 7/53871; H02M 7/5395
See application file for complete search history.

(56) References Cited

U.S. PATENT DOCUMENTS

| 8,982,593 B2* | 3/2015 | Nondahl | H02M 7/49 363/98 |
| 9,184,673 B2* | 11/2015 | Mihalache | H02M 7/49 |
| 10,186,995 B2* | 1/2019 | Dong | H02J 3/381 |

OTHER PUBLICATIONS

Townsend Christopher D et al: "Phase-Shifted Carrier Modulation Techniques for Cascaded H-Bridge Multilevel 1 Converters", IEEE Transactions on Industrial Electronics, IEEE Service Center, Piscataway, NJ, USA, vol. 62, No. 11, Nov. 1, 2015 (Nov. 1, 2015) pp. 6684-6696, XP011586113 / Jan. 11, 2015.

(Continued)

*Primary Examiner* — Gary L Laxton (57) ABSTRACT

A method for controlling multiple switching devices (15a-d, 75a-b) of a multilevel converter (1, 70) includes providing a plurality of carrier signals (C1-C6) and a reference signal (34, 80), the reference signal (34, 80) having a waveform range divided in a plurality of contiguous bands (B1-B6), dynamically allocating the plurality of carrier signals (C1-C6) to the multiple switching devices (15a-d, 75a-b), and generating pulse width modulation signals (18, 77) to generate switching events of the multiple switching devices (15a-d, 75a-b) based on a comparison of dynamically allocated carrier signals (C1-C6) with the reference signal (34, 80), wherein the plurality of carrier signals (C1-C6) have a phase shift between the carrier signals (C1-C6), and wherein the plurality of carrier signals (C1-C6) are dynamically allocated to the multiple switching devices (15a-d, 75a-b) such that for each switching device (15a-d, 75a-b) the plurality of carrier signals (C1-C6) are rotated and selected based on a position of the reference signal (34, 80) with respect to the plurality of bands (B1-B6).

15 Claims, 9 Drawing Sheets

(51) Int. Cl.
*H02M 7/5387* (2007.01)
*H02M 7/5395* (2006.01)

(56) References Cited

OTHER PUBLICATIONS

Antonio-Ferreira Abel et al: "Modulation techniques applied to medium voltage modular multilevel converters for renewable energy integration: A review", Electric Power Systems Research, vol. 155, Oct. 3, 2017 (Oct. 3, 2017), pp. 21-39, XP085289077 / Mar. 10, 2017.
PCT International Search Report and Written Opinion of International Searching Authority dated Jul. 11, 2018 corresponding to PCT International Application No. PCT/US2017/061717 filed Nov. 15, 2017.

* cited by examiner

PULSE WIDTH MODULATION CONTROL FOR A MULTILEVEL CONVERTER

BACKGROUND

1. Field

Aspects of the present disclosure relate to a multilevel power converter, particularly to pulse width modulation control of a multilevel power converter. A power converter may also be referred to as "drive", "drive system" or "power supply" and throughout the specification these terms can be used interchangeably.

2. Description of the Related Art

Multilevel power converters are used for example in applications of medium voltage alternating current (AC) drives, flexible AC transmission systems (FACTS), and high voltage direct current (HVDC) transmission systems, because single power semiconductor devices cannot handle high voltage. Multilevel converters typically include a plurality of power cells for each phase, each power cell including an inverter circuitry having semiconductor switches that can alter the voltage states or levels of the individual cells. Depending on the type of inverter circuitry used, e.g., half-bridge or full bridge, each power cell may have one or more switching legs. By controlling switching events of the individual switching legs of each power cell, it is possible to control the voltage across each cell and resultantly obtain an AC output waveform having multiple discrete voltage levels. A multilevel converter is often described by the number of discrete levels in output voltage waveform.

In certain applications, it may be desirable to control the switching events in a multilevel converter using pulse width modulation (PWM). A PWM based control provides several benefits, especially a reduction in the harmonic spectrum at every level. Multilevel converters typically use phase-shifted triangular carriers at the heart of the PWM method. A conventional method used for multilevel converters, particularly those having a cascaded H-bridge topology, is phase-shifted pulse width modulation (PSPWM) carrier method. In the PSPWM method, a reference signal for each cell, which is typically a sine-waveform, is compared against a triangular carrier to obtain the switching instances for a first switching leg of the cell. Typically, each cell has its own triangular carrier. In the PSPWM method these carriers are phase-shifted. The same reference sine-waveform is compared against the inverted triangular carrier to obtain the switching instances for the second switching leg of the same cell.

But the conventional PWM methods, such as those mentioned above, do not provide an optimum spectrum for line-line output voltage. The quality of the output voltage deteriorates especially at high output voltage frequency, or when the converter has a low number of levels. If the output voltage frequency is high and the converter has a reduced number of levels, an obvious option is to increase the switching frequency. But increasing the switching frequency also increases the overall losses.

SUMMARY

Briefly, aspects of the present disclosure relate to a multilevel power converter and further to pulse width modulation control of a multilevel power converter.

A first aspect of the present disclosure provides a method for controlling multiple switching devices of a multilevel converter comprising providing a plurality of carrier signals and a reference signal, the reference signal comprising a waveform range divided in a plurality of contiguous bands, dynamically allocating the plurality of carrier signals to the multiple switching devices, and generating pulse width modulation signals to generate switching events of the multiple switching devices based on a comparison of dynamically allocated carrier signals with the reference signal, wherein the plurality of carrier signals comprises a phase shift between the carrier signals, and wherein the plurality of carrier signals are dynamically allocated to the multiple switching devices such that for each switching device the plurality of carrier signals are rotated and selected based on a position of the reference signal with respect to the plurality of bands.

A second aspect of the present disclosure provides a multilevel converter for producing a multiphase AC power supply, comprising a plurality of power cells for supplying power to one or more phases, each power cell comprising multiple switching devices incorporating semiconductor switches, and a pulse width modulation controller connected to each of the power cells for controlling a voltage output of the plurality of power cells by controlling a switching event of each of the switching devices by pulse width modulation, wherein the pulse width modulation controller is configured to dynamically allocate a plurality of carrier signals to the multiple switching devices, and generate pulse width modulation signals to generate switching events of the multiple switching devices based on a comparison of dynamically allocated carrier signals with a reference signal, wherein the plurality of carrier signals comprises a phase shift between the carrier signals, and wherein the plurality of carrier signals are dynamically allocated to the multiple switching devices such that for each switching device the plurality of carrier signals are rotated and selected based on a position of the reference signal with respect to the plurality of bands.

DETAILED DESCRIPTION

Embodiments of the present disclosure relate to a new pulse width modulation (PWM) method which can be, in principle, used for many different types of multilevel converters. In general, a multilevel converter may have one or more phases, including a plurality of power cells for each phase. Each power cell includes an inverter circuit having one or more switching legs provided with switching devices, which can alter the voltage states or levels of the individual cells. By controlling switching events of the individual switching legs of each power cell, it is possible to control the voltage across each cell and resultantly obtain an AC output waveform having multiple discrete voltage levels.

While the embodiments of the present invention have been illustrated for certain exemplary multilevel converters that can be used in industrial applications, it is to be understood that the proposed PWM controller and its underlying methods of operation are not limited to the herein described types of multilevel converters, but can be generalized for multilevel converters with any number of cells or to many other multilevel topologies.

In a first embodiment, a proposed modulation method is illustrated for a cascaded H-bridge multilevel converter. An example of such a converter is the Perfect Harmony GH180 ® drive manufactured by Siemens Industry, Inc.

Figure 1:
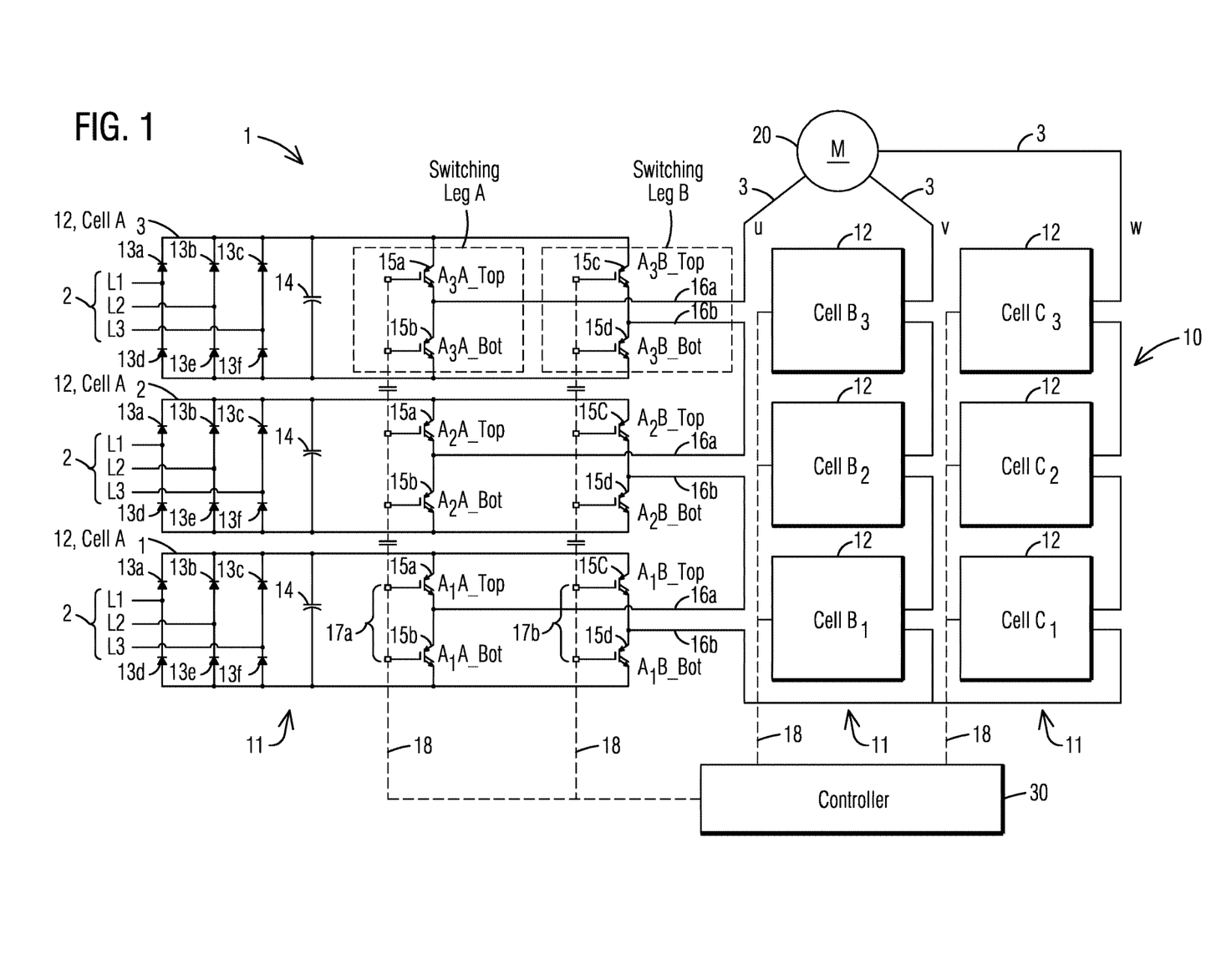
FIG. 1 is a schematic diagram illustrating a cascaded three-phase H-bridge multilevel converter having three cells/phase topology in accordance with an exemplary embodiment of the present disclosure.

FIG. 1 illustrates a schematic of an embodiment of a system 1 comprising cascaded H-bridge multilevel converter 10 having a seven-level topology, including three phases with three power cells per phase, which additionally incorporates a PWM controller 30 in accordance with an aspect of the present disclosure. The topology of the present embodiment of the multilevel converter is described for example in U.S. Pat. No. 5,625,545 to Hammond, the content of which is incorporated by reference herein for illustrative purposes.

In the example of FIG. 1, the system 1 is a medium voltage drive comprising a three-phase power source providing a power input 2 via lines L1, L2 and L3. The multilevel converter 10 is connected to the AC power input 2 and produces a three-phase AC power supply as output 3, via phase output lines u, v and w. The AC output 3 can be connected to a load 20, which in this example comprises a motor. The motor 20 may be operated by controlling the frequency and/or amplitude of the output voltage produced by the multilevel converter 10.

Each phase of the multilevel converter 10 comprises a respective phase leg 11 formed from a plurality of power cells 12 arranged in a cascaded manner. In the example of FIG. 1, the phase legs 11 are each formed from the same number of power cells 12, namely three, that are connected in series. Each power cell 12 of a phase is connected to the power input 2 via respective input lines L1, L2 and L3. Power to the input lines L1, L2, L3 may be provided, for example, via a multi-phase winding transformer. The power cells 12 of the three phases are respectively labelled as cell $A_1$ through cell $A_3$, cell $B_1$ through cell $B_3$ and cell $C_1$ through cell $C_3$. Each power cell 12 is responsive to control signals from the PWM controller 30 to alter the voltage level and/or frequency output, resulting in a multilevel voltage waveform for each phase. The power cells 12 generally include power semiconductor switching devices, passive components (inductors, capacitors), control circuits, processors, interfaces, and other components for communicating with the controller 30. The power cells 12 operate based on signals from the controller 30.

Each of the power cells 12 include single-phase inverter circuitry connected to separate DC sources produced by a rectification of the AC power input for each power cell 12 via input lines L1, L2, L3. In this example, the rectification is carried out by diode rectifiers 13a-f arranged in a bridge rectifier configuration. The present example also uses filtering circuitry including, for example, a capacitor 14, for smoothing out voltage ripples from the rectified DC power.

The inverter circuitry of each cell 12 comprises power semiconductor switching devices 15a-d arranged in an H-bridge, also referred to as full bridge, configuration. The switching devices 15a-d may include, for example and without limitation, power transistors such as insulated-gate bipolar transistors (IGBT). The switching devices 15a, 15b connect to cell output line 16a while the switching devices 15c, 15d connect to cell output line 16b. The transistors 15a-d receive pulse width modulation signals, for example, in the form of gate input signals 18 controlled by the controller 30 based on pulse width modulation. The controller 30 selects either of transistors 15a or 15b to be ON via a first switching leg 17a, and either of transistors 15c or 15d to be ON via a second switching leg 17b, which will permit power to pass to the load 20 by way of the line 16a or 16b respectively. In other words, a controller triggered switching event of the switching leg 17a causes one of the transistors 15a, 15b to be in an ON state and the other to be in OFF state. Likewise, a controller triggered switching event of the switching leg 17b causes one of the transistors 15c, 15d to be in an ON state and the other to be in OFF state. In the embodiments illustrated, the switching legs 17a, 17b of an individual cell 12 are simply referred to as switching leg A and switching leg B of that individual cell 12.

Each of the power cells 12 may be constructed internally to low-voltage standards, despite its inclusion in a medium-voltage apparatus drive 1. By way of example, each power cell 12 may have a 600-volts rating. Thus, the maximum voltage level that can be output by each of power cells 12 is about 600 VDC. Depending on which transistors are ON, the output voltage across the cell output lines 16a, 16b of each power cell 12 may be of either polarity or zero. Thus, each power cell 12 can have three output states: +600 VDC, −600 VDC, or ZERO VDC. Due to the serial connection between three power cells 12 in each phase output line, such as, for example, cells $A_1$, $A_2$, $A_3$ to the phase output line u, it is possible to produce a maximum output voltage magnitude of about 1800 VDC for the respective phase output line. Each power cell 12 may be operated independently of another. Therefore, it is possible to provide at least seven voltage levels per phase to motor 20. The approximate values of these line-neutral voltage states include +/−1800 VDC, +/−1200 VDC, +/−600 VDC and ZERO VDC. In general, a cascaded H-bridge multilevel converter having N number of power cells 12 per phase is capable for producing NL number of line-neutral voltage states for each phase, where $N_L=2N+1$. It should be noted that the line-line voltage may have more levels than the phase (line-neutral) voltage. For example, a cascaded H-bridge multilevel converter may have $2N_L-1$ levels in the line-line voltage. Other topologies may have different number of levels depending on the modulation technique used.

The motor 20 may comprise any type AC-type motor, for example, synchronous, asynchronous, permanent magnet, and may be rated for low voltage, medium voltage or high-voltage. For example, medium-voltage AC motors, such as those used in industrial process control, may operate in the 4.16 kV to 13.8 kV range. Greater or lesser voltage may be used. More than one motor 20 may be connected. Other loads may be used instead of or in addition to the motor 20. The motor 20 responds to the voltage applied by the multilevel converter on the three phases, for example, to increase, decrease or maintain a speed or position.

The controller 30 may comprise, for example, a processor with a memory for storing and executing specific instructions to implement the illustrated PWM control. The controller 30 may be constructed, for example and without limitation, by a microcontroller with internal or external memory, or by a fixed-point or floating-point digital signal processor (DSP), or by a programmable logic device (PLD), or any combination of the above mentioned. By pulse-width modulating the voltage reference for each phase, the controller 30 controls each of the power cells 12, and thus, the amplitude and frequency of the voltage output between the output lines 16a, 16b of each power cell 12. A control circuit or control board in the power cells 12 may receive the voltage reference and generate the gating pulses for power switching devices using appropriate vector controls and pulse-width modulation. Alternatively, the controller 30 may output the gating pulses provided to the cells 12 based on the voltage references.

As noted before, a known method used for multilevel converters, particularly those having a cascaded H-bridge topology such as system 1, is phase-shifted pulse width modulation (PSPWM) carrier method. In the PSPWM method, a reference signal for each cell 12, which is typically a sine-waveform, is compared against a triangular carrier signal to obtain switching instances for the first switching leg 17a (leg A) of the cell 12. Typically, each cell 12 has its own triangular carrier signal. In the PSPWM method, the carrier signals, herein also referred to as simply carriers, are phase-shifted. The same reference sine-waveform is compared against the inverted triangular carrier signal to obtain switching instances for the second switching leg 17b (leg B) of the same cell 12.

For an $N_L$ topology, wherein $N_L$ is the number of line-neutral voltage states, herein also referred to as levels, and N is the number of cells 12 of a phase, the cells 12 of a same phase use a phase displacement $T_{shift\_phase}$ between the carriers used for the first switching leg 17a according to formula (1):

$$T_{shift\_phase} = \frac{2 \cdot \pi}{N_{levels} - 1} = \frac{\pi}{N} \quad (1)$$

In total, there will be 2N carriers per each of the three phases.

An additional phase shift as provided in formula (2) may be used between carriers of the first switching leg 17a of a last cell 12 of one phase and a first cell 12 of a next phase:

$$T_{shift\_legs} = \frac{2 \cdot \pi}{3 \cdot (N_{levels} - 1)} = \frac{\pi}{3 \cdot N} \quad (2)$$

It is known that the traditional modulation strategy as provided above does not provide an optimum spectrum for the line-line voltage. An improvement in the output voltage spectrum can be achieved by using for example a phase disposition (PD) modulator. In this approach, for an $N_L$ converter, there are $(N_L-1)$ carrier waveforms of the same amplitude, phase and frequency arranged into contiguous bands that fully occupy the modulation range, from −1 to 1. The intersection of the modulating reference with the carriers determines the switched voltage level for each phase leg at any instant. The problem is that this approach determines only the desired switched voltage level of each leg and not the actual switching instance for the devices. Therefore, the resulting switched voltage waveform must then be decoded to select the specific cell states. In addition, this process must ensure the all cells are sharing the power equally.

A different modulation method is proposed herein, which is also referred to as selective phase shifted carrier PWM method. The proposed modulation method will be described with respect to cascaded H-bridge multilevel topology as illustrated for example in FIG. 1, and then extended to modular multilevel converter (MMC) topology. The principle of the proposed method applies to many numbers of cells; however, it will be explained relating to the system 1 comprising nine cells 12 (three cells per phase) as illustrated in FIG. 1.

Figure 2:
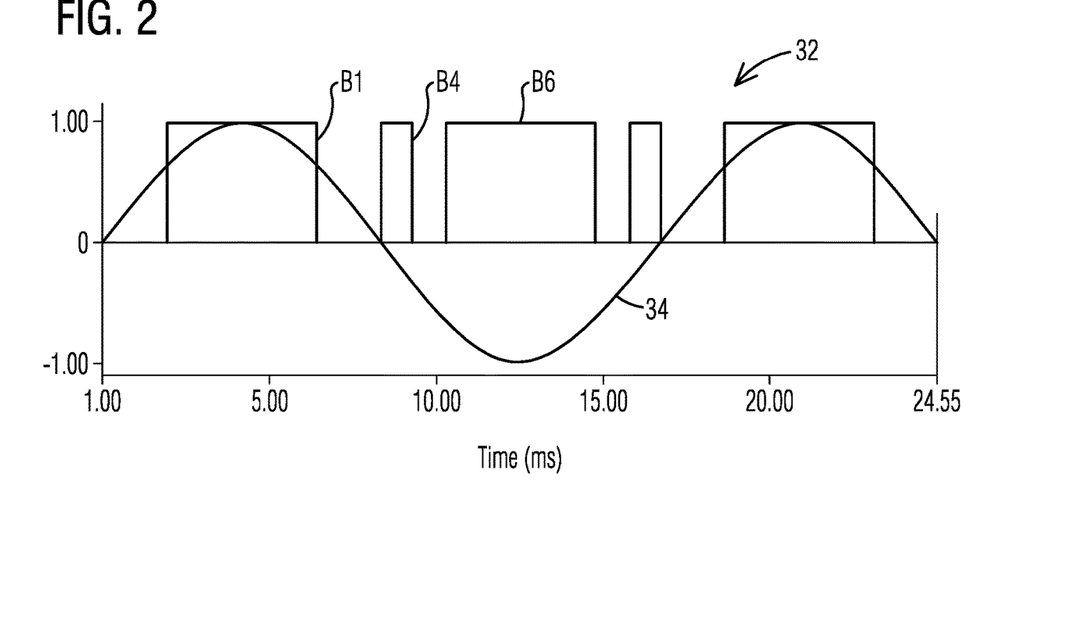
FIG. 2 illustrates a graphical representation of a band arrangement and a modulating reference waveform in accordance with an exemplary embodiment of the present disclosure.

FIG. 2 illustrates a graphical representation of a band arrangement 32 and a modulating reference waveform 34 in accordance with an exemplary embodiment of the present disclosure.

Since there are three cells 12 per phase and each cell 12 can create three levels (as described with reference to our example of FIG. 1) there will be a total of seven levels in the phase output voltage (line-neutral) in which the modulating reference waveform 34 can be divided. Accordingly, a range of the modulating reference waveform 34 can be divided in band arrangement 32 including six contiguous bands B1 through B6 equally spaced.

The modulating reference waveform 34 may also be referred to as a modulating waveform or sine-wave. The range of the reference signal waveform 34 may be referred to as a modulation range of the reference signal. The amplitude of the reference signal waveform 34 is referred to as a modulation index m of the reference signal waveform 34. The illustrated reference signal waveform 34 is a periodic waveform, having, for example, a substantially sinusoidal shape. It is to be understood that there is no restriction on the shape of the reference signal waveform 34 as long as the waveform 34 is restricted to the interval [−1 1].

The band arrangement 32 comprises bands Band 1 (B1) through Band 6 (B6), wherein each band B1 through B6 of the band arrangement 32 covers ⅓ of the maximum modulation index m. For the general case, there will be 2N bands for a converter with N cells per phase and each one will occupy 1/N of the maximum modulation index m. For the ease of identification, FIG. 2 only depicts identifications of Band 1 B1, Band 4 B4 and Band 6 B6, respectively. The definition of each band B1-B6 is given below, wherein m is the amplitude of the sinewave modulating reference waveform:

Band 1: ⅔<m<1,
Band 2: ⅓<m<⅔,
Band 3: 0<m<⅓,
Band 4: −⅓<m<0,
Band 5: −⅔<m<−⅓,
Band 6: −1 <m <−⅔.

Figure 3:
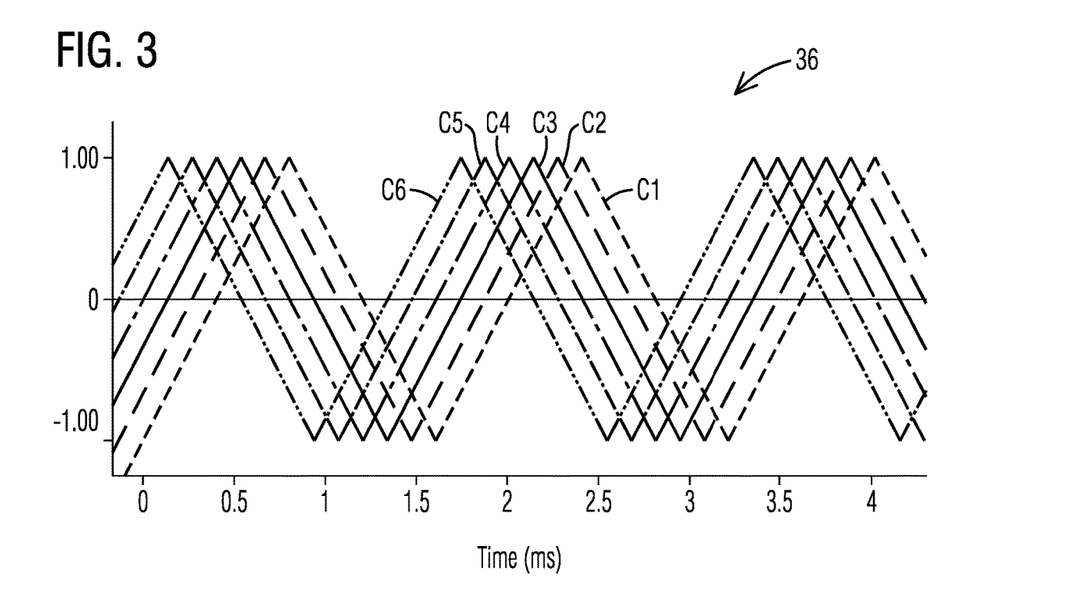
FIG. 3 illustrates a graphical representation of a simulated triangular carrier arrangement with carrier signals through in accordance with an exemplary embodiment of the present disclosure.

FIG. 3 illustrates a graphical representation of a simulated triangular carrier arrangement 36 with carrier signals C1 through C6 in accordance with an exemplary embodiment of the present disclosure. Traditional PSPWM methods assign a carrier signal to each switching leg A and switching leg B, wherein the carrier signals are permanently assigned to each switching leg A, B.

In contrast to traditional PSPWM methods, the proposed method comprises establishing carrier signals (2N) with a different phase shift $T_{shift\_phase\_new}$ between the carrier signals. The phase shift is given by formula (3), wherein phase shift $T_{shift\_phase\_new}$ is half of the phase shift of the traditional PSPWM method (see formula (1)):

$$T_{shift\_phase\_new} = \frac{\pi}{N_{levels} - 1} = \frac{\pi}{2 \cdot N} \quad (3)$$

FIG. 3 illustrates six carrier signals C1-C6 for the example of three cells per phase determined according to formula (3). The carrier signals C1-C6 comprise a waveform having a substantially triangular shape.

According to an exemplary embodiment, none of the six carrier signals C1, C2, C3, C4, C5 and C6 are permanently assigned to the switching legs A, B of the cells 12 of a phase. Instead, the carrier signals C1, C2, C3, C4, C5 and C6 are rotated and dynamically allocated to all switching devices 15a-15d of the switching legs A, B of one phase, based on a position of the reference waveform 34 with respect to the six bands B1-B6 previously described with reference to FIG. 2.

A switching event, i.e. the switching ON or OFF, of a switching device of the switching leg, is achieved by a pulse width modulation signal, for example, as a gate input signal 18, which is triggered by the controller 30 based on a comparison of the carrier signal with the reference signal.

Figure 4:
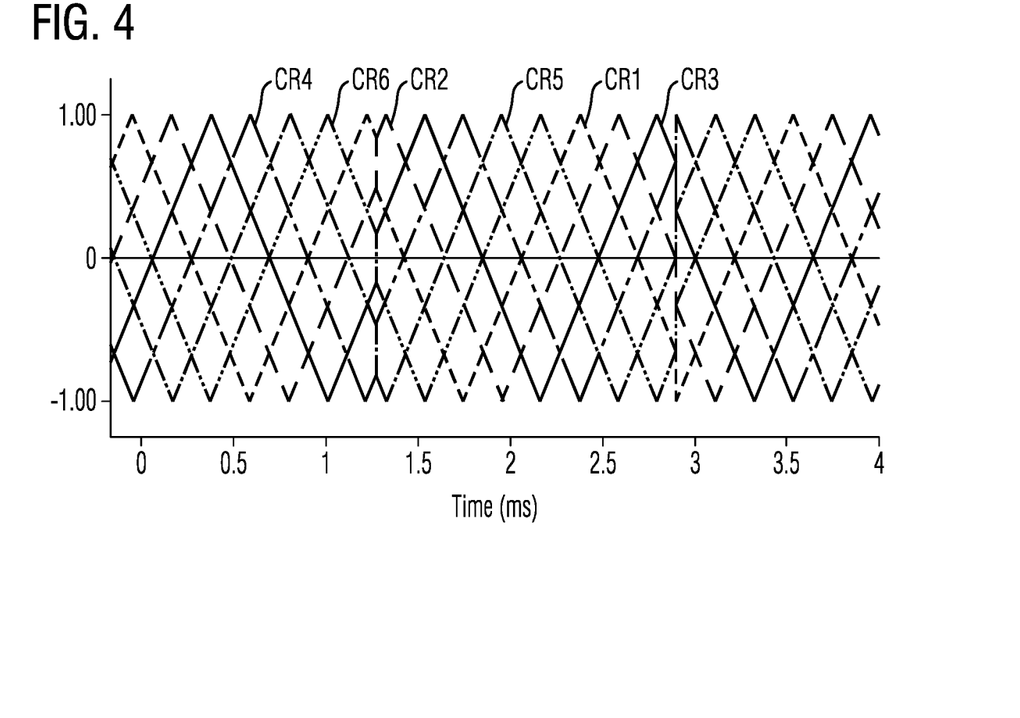
FIG. 4 illustrates a graphical representation of a simulated carrier arrangement with rotating carrier signals using a proposed PSPWM method with a modulation index of 1 in accordance with an exemplary embodiment of the present disclosure.

FIG. 4 illustrates a graphical representation of a simulated carrier arrangement 40 with rotating carrier signals CR1 through CR6 using the proposed PSPWM method with a modulation index of 1 in accordance with an exemplary embodiment of the present disclosure.

A dynamic allocation of the carriers C1-C6 assigns to each switching device 15a-15d the carrier signal (out of the multiple carrier signals C1-C6) that leads to a lowest possible total harmonic distortion (THD). Thus, each switching device 15a-15d in the cell 12 has a rotating carrier $CR_n$ which can be considered a function of the six carriers C1-C6 as provided by formula (4):

$$CR_n = \sum_{i,j,m} B_i \cdot K_j \cdot C_m, n = 1 \dots 6 \quad (4)$$

In equation (4), $B_i$ is a binary signal that is equal to 1 (one) when the reference waveform 34 is within band i, and it is equal to 0 (zero) when the reference waveform 34 is outside band i, wherein i corresponds to the number of bands B1-B6 (i=1 . . . 6). Coefficient $K_j$ can have two values: −1 and 1.

The equation (4) provides that rotating carrier signal $CR_n$ which is assigned to a switching device 15a-15d of a cell 12 is one of the six carriers C1 through C6 or their inverted values, −C1 through −C6, and that switching from one carrier to another carrier C1-C6 takes place at a crossing from one band to another band B1-B2. In practice, it is much easier to use a state machine to implement equation (4), and such a state machine will be described with reference to FIG. 5 illustrating a state machine which dynamically generates the rotating carrier signals $CR_n$ for all the switching devices 15a-15d of one phase.

With respect to FIG. 1 and FIG. 4, the rotating carrier signals CR1, CR2, CR3, CR4, CR5 and CR6 are used by the switching devices $A_3\_A\_Top$, $A_3\_B\_Bot$, $A_2\_A\_Top$, $A_2\_B\_Bot$, $A_1\_A\_Top$, $A_1\_B\_Bot$, respectively. Although the carriers in FIG. 4 show discontinuities due to the dynamic allocation of C1-C6, these discontinuities do not lead to pulse disruptions or additional switch events.

Figure 5:
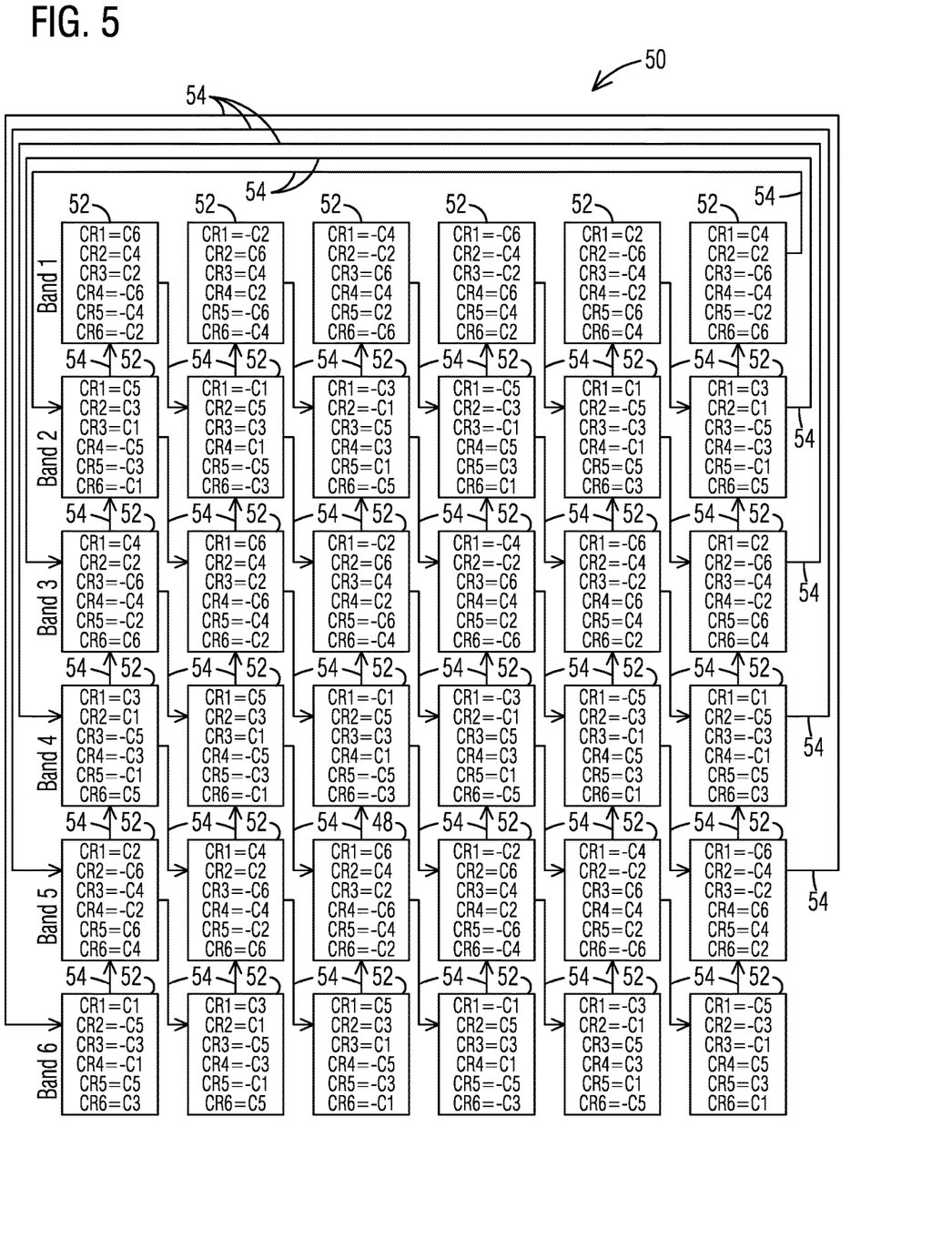
FIG. 5 illustrates a schematic of an example of a finite state machine which dynamically allocates carrier signals for all the switching devices of each switching leg for a cascaded H-bridge multilevel converter having a three cells/phase topology, in accordance with an exemplary embodiment of the present disclosure.

FIG. 5 illustrates a schematic of an example of a finite state machine 50 which dynamically allocates the carriers C1-C6 for all the switching devices 15a-d of each switching leg A, B for a cascaded H-bridge multilevel converter having a three cells/phase topology, in accordance with an exemplary embodiment of the present disclosure.

According to the example illustrated in FIG. 5 with three cells 12 per phase, the state machine 50 comprises 6*6=36 states. For a general case where there are N cells per phase, the state machine will have 2N*2N=4N² states.

Blocks 52 illustrate carrier allocations to six switching devices 15a-d of a phase for a band B1-B6 instantaneously occupied by the reference signal 34, while the arrows 54 represent transitions or crossovers of the reference signal 34 from one band to another B1-B6.

Every horizontal row of a block 52 includes allocations of carriers C1-C6 within a band B1-B6 (in general: $B_x$, wherein x=1 . . . 2N and N is the number of cells 12 per phase). As noted before, in the example described with respect to FIG. 1, there are six bands B1-B6 (see also FIG. 2). With respect to FIG. 5 and FIG. 1, the rotating carrier signals CR1, CR2, CR3, CR4, CR5 and CR6 are used by the switching devices $A_3\_A\_Top$, $A_3\_B\_Bot$, $A_2\_A\_Top$, $A_2\_B\_Bot$, $A_1\_A\_Top$, $A_1\_B\_Bot$, respectively.

Figure 6:
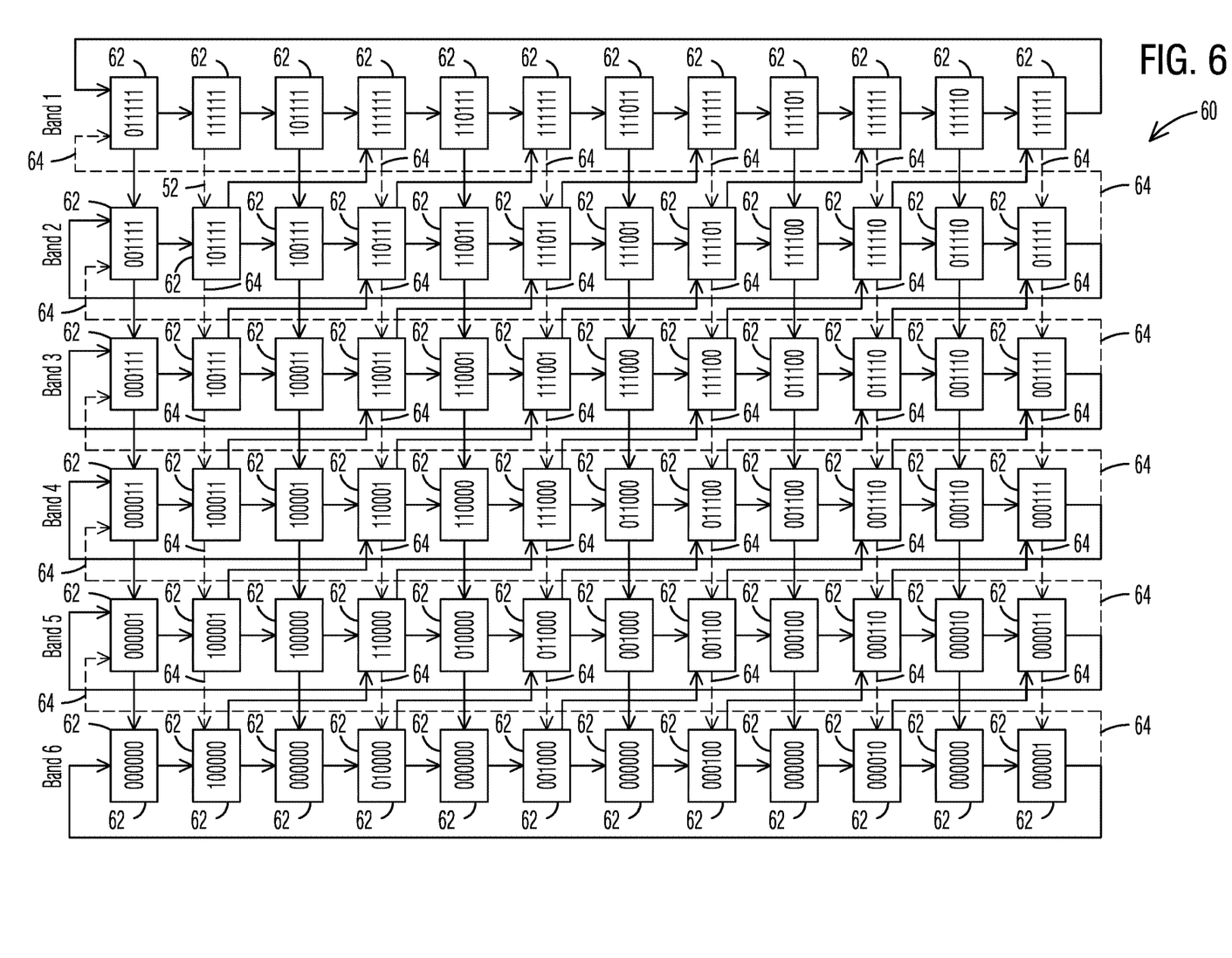
FIG. 6 illustrates a schematic of state transitions based on a proposed carrier allocation method for a cascaded H-bridge multilevel converter having a three cells/phase topology, in accordance with an exemplary embodiment of the present disclosure.

Assuming that each of the six switching devices 15a-d of the above example is assigned a value of 0 if they are OFF and a value of 1 if they are ON, a state diagram as illustrated in FIG. 6 can be drawn showing all possible states per phase using the state machine 50 of FIG. 5.

FIG. 6 illustrates a schematic of state transitions based on a proposed carrier allocation method for a cascaded H-bridge multilevel converter having a three cells/phase topology, in accordance with an exemplary embodiment of the present disclosure.

According to FIG. 6, an exemplary state diagram 60, where the 2N digits binary number (6 digits in this case, since N=3, where N is the number of power cells per phase) directly indicates if the switching devices $A_3\_A\_Top$, $A_3\_B\_Bot$, $A_2\_A\_Top$, $A_2\_B\_Bot$, $A_1\_A\_Top$, $A_1\_B\_Bot$ are ON or OFF. The diagram 60 confirms that at every state 62 only one switching device switches per phase and that there are no pulse disruptions at the band crossings. It is to be noted that the dashed lines 64 indicate transitions to or from the same states into a different band and they could be ignored. They are shown here just for the ease of understanding how a transition from one band to another band using the illustrated method keeps the same state and therefore does not introduce any disruption in the pulse generation. For example, from state 111111 in band 1 it is possible to move to the same state 110111 which may be in band 1, if there is no band transition or, in band 2 if there is a band transition.

The finite state machine 50 may be implemented by the controller 30 by providing suitable instructions/algorithms to the controller 30. It will be understood that in addition to or alternate to a finite state machine 50, any other technique or algorithm may be implemented that can select the appropriate carrier based on the allocation rule specified above. In another embodiment, state machine 50 may be implemented with field programmable gate arrays (FPGA) or other digital platforms such as digital signal processors (DSP), systems on a chip (SoC) etc.

Figure 7:
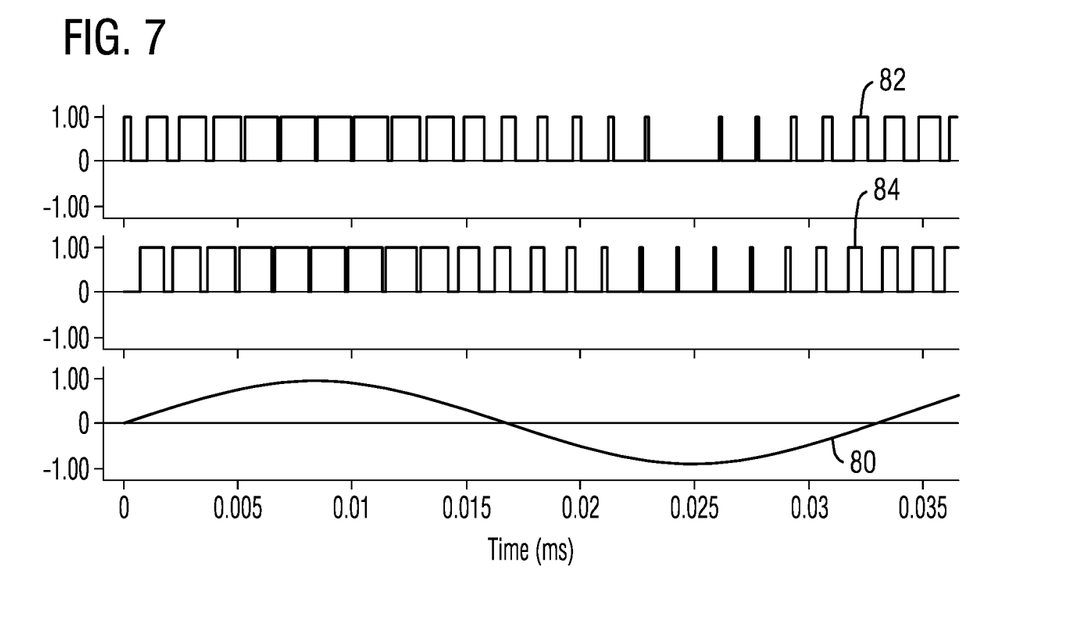
FIG. 7 illustrates a graphical representation of pulses obtained using a proposed carrier allocation method for a sinusoidal reference signal in accordance with an exemplary embodiment of the present disclosure.

FIG. 7 illustrates a graphical representation of pulses obtained using a proposed carrier allocation method for a sinusoidal reference signal 80 in accordance with an exemplary embodiment of the present disclosure. Specifically, FIG. 7 illustrates pulses 82, 84 for the switching devices $A_3\_A\_Top$, $A_3\_B\_Bot$, respectively (see FIG. 1), using the illustrated carrier allocation method for the continuous sinusoidal reference signal 80. Although the carriers CR1-CR6 show discontinuities in FIG. 4 due to the dynamic allocation of C1-C6, it can be seen in FIG. 7 that these discontinuities do not lead to pulse disruptions or additional switching events.

FIG. 8 through FIG. 13 illustrate simulation results demonstrating differences in quality of output voltages and currents obtained by the proposed modulation method in comparison to a conventional PSPWM method for a cascaded H-bridge multilevel converter with three cells per phase in accordance with an exemplary embodiment of the present disclosure. A nine-cell cascaded H-bridge converter drive as shown for example in FIG. 1 was simulated according to the following parameters:

Cell Input Voltage: 1050 Vdc
Cell Output Frequency: 60 Hz
Cell Output Current (Nominal): 170 A RMS
Cell Switching Frequency: 625 Hz
Load Resistor (Rload): 13 ohms
Load Inductor (Lload): 5400 µH
Dead Time: 5 µs It is considered that a nine-cell drive represents a worst-case scenario because it has the lowest equivalent switching frequency compared to drives with more than nine cells. It is possible to mathematically show that the proposed modulation method provides a superior harmonic spectrum for the output line-line voltage because it produces a large harmonic at the switching frequency in the phase voltage spectrum that cancels in the line-line voltage. A selected number of simulation results are displayed.

Figure 8:
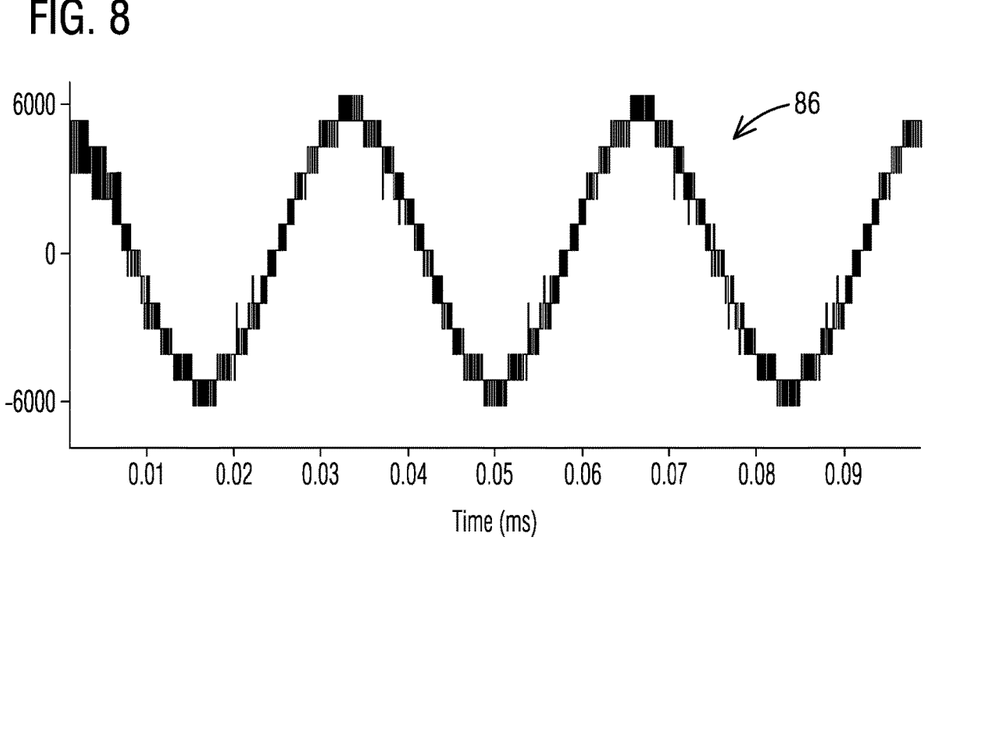
FIG. 8 through FIG. 13 illustrate simulation results demonstrating differences in quality of output voltages and currents obtained by the proposed modulation method in comparison to a conventional PSPWM method for a cascaded H-bridge multilevel converter with three cells per phase in accordance with an exemplary embodiment of the present disclosure.
Figure 9:
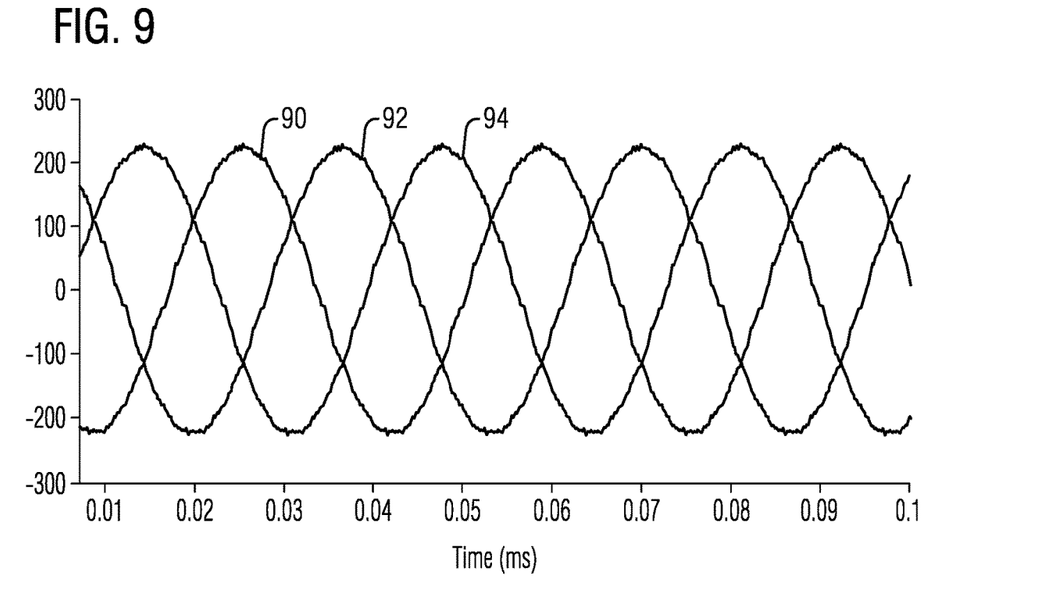

FIG. 8 illustrates a graphical representation of a simulated line-line voltage spectrum 86 obtained with the proposed PSPWM for the simulated drive configuration using a sinusoidal modulating waveform at modulation index equal to 1. FIG. 9 illustrates a graphical representation of simulated three-phase currents 90, 92, 94 using the proposed modulation method corresponding to the line-line voltage waveforms shown in FIG. 8.

Figure 10:
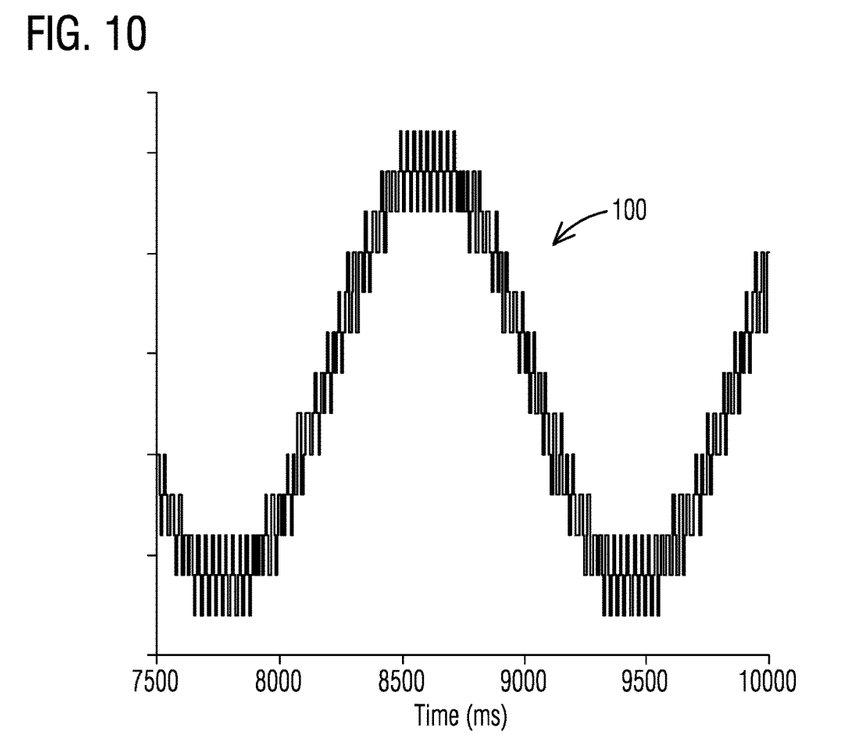
Figure 11:
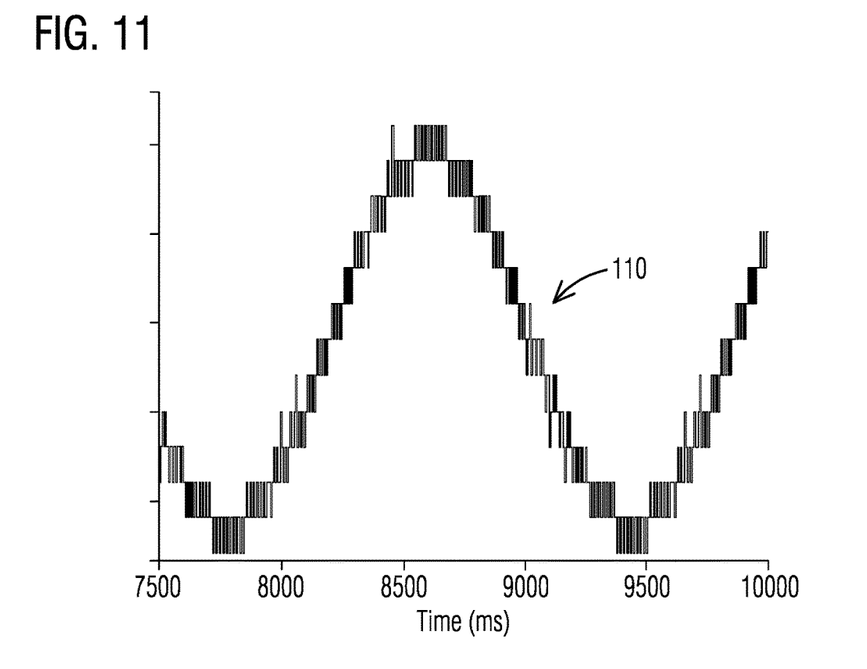

FIG. 10 and FIG. 11 illustrate side by side comparisons between graphical representations of simulated line-line voltage spectra using a known phase-shifted modulation and the proposed selective phase-shifted modulation method at unity modulation index. FIG. 10 illustrates simulated line-line voltage spectrum 100 using the known PSPWM method, and FIG. 11 illustrates simulated line-line voltage spectrum 110 using the proposed selective PSPWM method.

Figure 12:
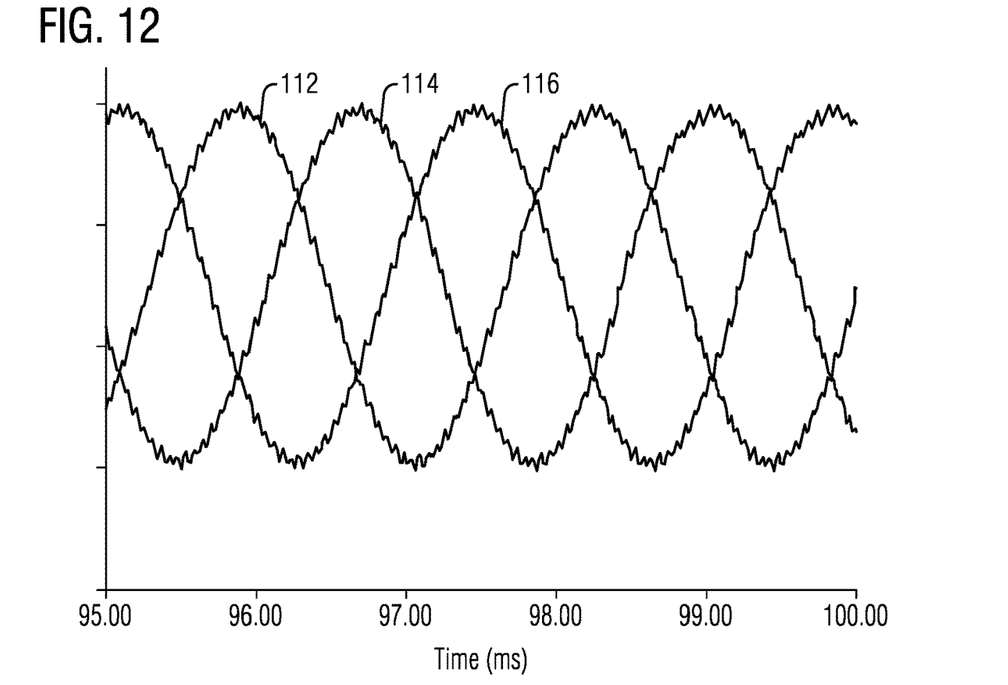
Figure 13:
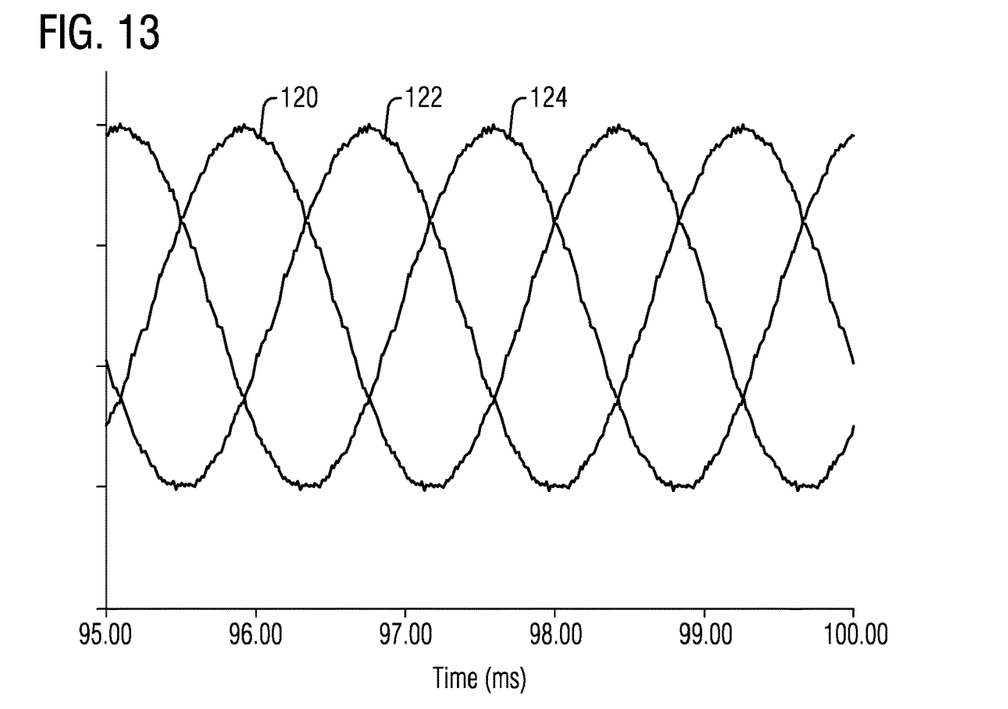

FIG. 12 and FIG. 13 illustrate side by side comparisons between graphical representations of simulated three-phase currents using a known PSPWM method and the proposed selective PSPWM method. FIG. 12 illustrates simulated three-phase currents 112, 114, 116 using the known PSPWM method, whereas FIG. 13 illustrates simulated three-phase currents 120, 122, 124 using the proposed selective PSPWM method. An advantage of the proposed selective PSPWM method can be seen in the comparison between current waveforms shown in FIG. 12 and FIG. 13, where the output frequency of the drive is increased to 400 Hz while the switching frequency is kept 600 Hz. The proposed selective PSPWM method produces high quality sinusoidal waveforms 120, 122, 124, whereas the standard PSPWM method would need to have the switching frequency increased to match the same performance.

In the following, application of the proposed modulation method for a modular multilevel converter (MMC) will be described. Modular multilevel converters can be used, for example, as voltage source converters for producing high-voltage direct current (HVC).

Figure 14:
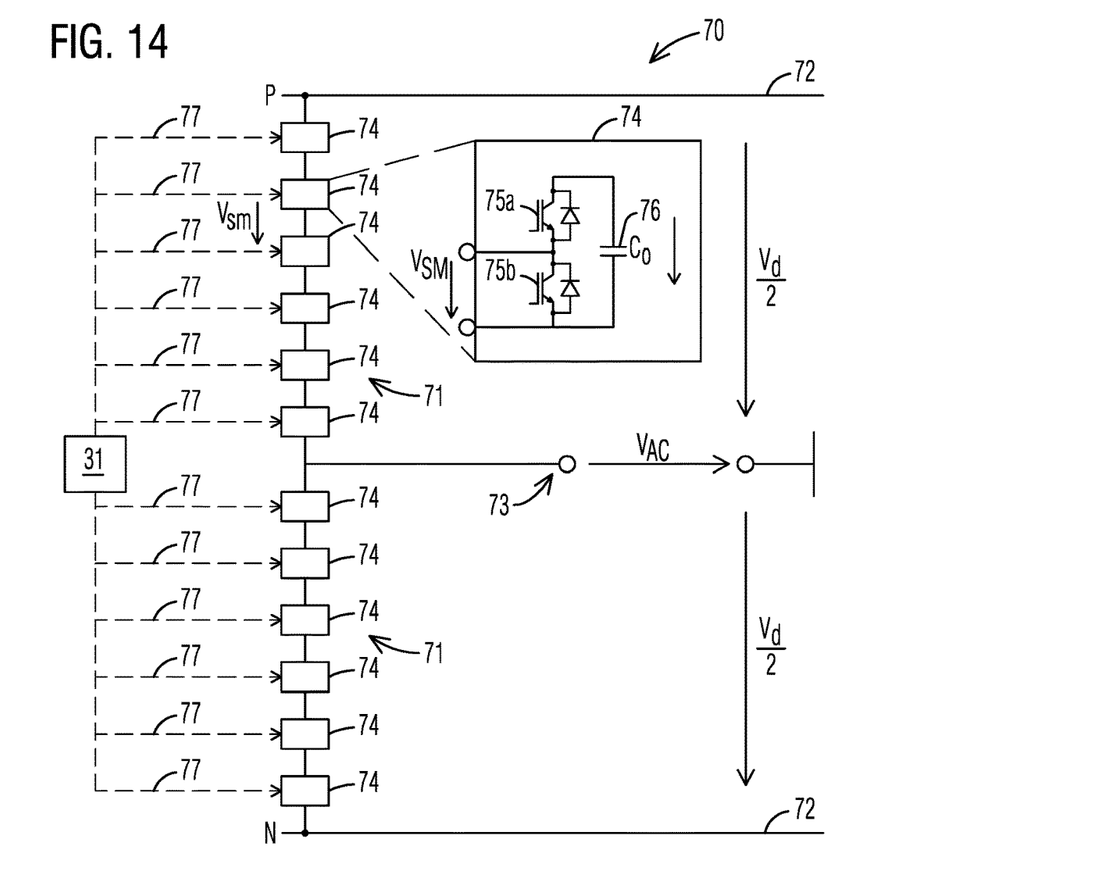
FIG. 14 illustrates a modular multilevel converter (MMC) that includes a PWM controller in accordance with another embodiment of the present disclosure.

FIG. 14 illustrates a modular multilevel converter 70 that includes a PWM controller 31 in accordance with another embodiment of the present disclosure. The topology of an MMC is generally known and will not be described in detail herein. Briefly, the MMC 70 includes two arms 71 per phase. Although only one phase is illustrated in FIG. 14 the MMC 70 may include multiple phases, for example three phases. Each arm 71 connects a DC input terminal 72 to an AC output terminal 73. A DC voltage Vd is applied across the DC input terminal 72. Each arm 71 is effectively a high-voltage controlled switch comprising a plurality number of independently operable power cells 74 connected in series. Each power cell 74 of an MMC is referred to as a sub-module. In the illustrated embodiment, there are six sub-modules 74 per arm 71. An example of such a modular multilevel converter is the Perfect Harmony GH150® drive manufactured by Siemens Industry, Inc.

Each power cell or sub-module 74 of the exemplary MMC 70 includes a half-bridge inverter circuit comprising switching devices 75a and 75b connected in series across a capacitor 76 with the midpoint connection and one of the two capacitor terminals brought out as an external connection. The switching devices 75a and 75b include, for example, power transistors, such as IGBTs or any other type of semiconductor switches. Each sub-module 74 may be operated as a two-level converter (i.e., with two output voltage states namely $V_{SM}$ and ZERO), by appropriately controlling the switching devices 75a and 75b via pulse width modulation signals, such as gate input signals 77 generated by the PWM controller 31. In this example, since each sub-module 74 has a half-bridge inverter configuration, switching of the switching devices 75a and 75b are implemented in one switching leg. Herein, a controller 31 triggered switching event of the switching leg causes one of the switching devices 75*a* and 75*b* to be in an ON state and the other to be in OFF state.

Although not shown, the current via line outputs 73 may be fed to a load, such as a motor. The three-phase MMC topology illustrated herein does not provide a specific phase voltage as does the cascaded H-bridge topology. The MMC provides line-line voltages, which is generally sufficient, especially for motor applications where it is the line-line voltage that is of relevance as the neutral is inside the motor.

By pulse-width modulating the voltage reference for each phase, the controller 31 controls each of the sub-module 74. A control circuit or control board in a sub-module 74 may receive the voltage reference and generate the gating pulses for power switching devices 75*a* and 75*b* using appropriate vector controls and pulse-width modulation. Alternatively, the controller 31 may output the gating pulses provided to the sub-module 74 based on the voltage references.

In the proposed modulation method, each phase is assigned a modulating reference signal, for example but not necessarily, having a substantially sinusoidal waveform. From each phase reference signal, arm reference signals are developed for each of the two arms 71 of the respective phase. In this case, each sub-module 74 has a single switching leg for which a carrier signal is dynamically allocated from a plurality of carrier signals C1-C6.

For the switching leg of each sub-module 74, a switching event, i.e. the switching ON or switching OFF of a switching device of the switching leg, is effected by the gate input signal 77, which is triggered by the controller 31 based on a comparison of the carrier signal with the arm reference signal. As in the earlier embodiment, the present embodiment uses a plurality of carrier signals C1-C6 and rotate or cycle the carrier signals C1-C6 for each switching leg. The method provides that the carrier signal for each switching leg is dynamically selected from a plurality of carrier signals.

The number of carrier signals C1-C6 for each arm 71 in this example equals n, where n is the number of sub-modules 74 per arm 71 of the phase. As described before, each carrier signal C1-C6 corresponds to one of a plurality of contiguous bands B1-B6 that fully occupy a range of a waveform of the arm reference signal. The carrier signals C1-C6 are phase-shifted (i.e., delayed by a time interval) from each other, but may be identical in every other respect. The dynamically selected carrier signal C1-C6 corresponds to a band B1-B6 that is instantaneously occupied by the arm reference signal.

The sub-modules 74 of the MMC 70 have same voltage ratings as the cells 12 used in the simulation of the cascaded H-bridge converter 1 (see for example FIG. 1).

In an embodiment, the dynamic allocation of the carriers for the MMC 70 is carried out by a finite state machine to distribute the carriers to the switching arms associated with each phase on a cyclical basis as explained above with respect to the cascaded H-bridge multilevel converter. The finite state machine may be implemented by the controller 31 by providing suitable instructions/algorithms to the controller 31. It will be understood that in addition to or alternate to a finite state machine, any other technique or algorithm may be implemented that can select the appropriate carrier based on the allocation rule specified above.

Figure 15:
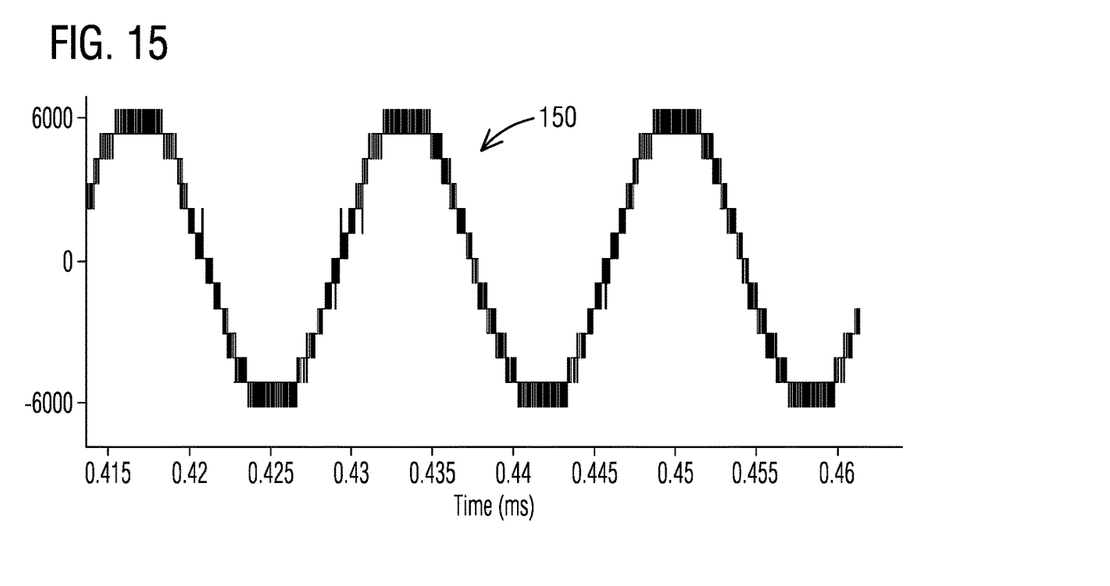
FIG. 15 illustrates a graphical representation of simulated line-line voltage spectrum for a modular multilevel converter as illustrated for example in FIG. 14 using a proposed selective PSPWM in accordance with an exemplary embodiment of the present disclosure.

FIG. 15 illustrates a graphical representation of simulated line-line voltage spectrum for a modular multilevel converter as illustrated for example in FIG. 14 using the proposed selective PSPWM in accordance with an exemplary embodiment of the present disclosure. The simulated line-line voltage spectrum 150 uses a sinusoidal with added third harmonic modulating waveform at modulation index equal to 1.15. For modular multilevel converters, as shown for example in FIG. 14, capacitor voltages of capacitors 76 of arms 71 are well balanced, because the carriers are rotated and dynamically allocated to all switches 75*a*, 75*b*, hence a natural balancing mechanism takes place for all capacitor voltages.

The proposed selective PSPWM method is based on a dynamic allocation of triangular phase shifted carrier signals and produces a superior line-line voltage spectrum. Further, a switching frequency is reduced, and an output fundamental is increased, particularly for low cell counts. In addition, the proposed modulation method may be used for both cascaded H-bridge and modular multilevel converter (MMC). It should be noted that from a perspective of the number of carrier signals, the proposed method uses a smaller number of carrier signals compared to existing modulation methods, because additional phase-shifts between phase carriers are not required.

Summarizing, improvement of the output voltage quality of the multilevel converter allows use of a lower switching frequency, thus improving overall efficiency of the system. Further, improvement of the output voltage quality of the converter allows operation of the converter at a higher output frequency without increasing the switching frequency. The proposed modulation method is easy to implement as it requires a smaller number of carriers compared to standard phase-shifted pulse width modulation, and may be used for both cascaded H-bridge and modular multilevel converters. Further, the proposed method may be used to balance power among all switching devices in a multilevel converter.

Principles of the above described exemplary embodiments may be extended or adapted to several other multilevel converter topologies that generally have, for each phase, a plurality of switching legs including at least one switching device. These may include, for example and without limitation, diode claimed type, capacitor clamped type (with flying capacitors), among others.

While specific embodiments have been described in detail, those of ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps, the use of articles "a" or "an" does not exclude a plurality, and the term "multiple" refers to "a plurality of", i.e., more than one.

The invention claimed is:

1. A method for controlling multiple switching devices of a multilevel converter, comprising:
    providing a plurality of carrier signals and a reference signal, the reference signal comprising a waveform range divided in a plurality of contiguous bands,
    dynamically allocating the plurality of carrier signals to the multiple switching devices, and
    generating pulse width modulation signals to generate switching events of the multiple switching devices based on a comparison of dynamically allocated carrier signals with the reference signal,
    wherein the plurality of carrier signals comprises a phase shift between the carrier signals, and wherein the plurality of carrier signals are dynamically allocated to the multiple switching devices such that for each switching device the plurality of carrier signals are rotated and selected based on a position of the reference signal with respect to the plurality of bands.

2. The method of claim 1, wherein the phase shift ($T_{shift\_phase\_new}$) between the carrier signals is $$T_{shift\_phase\_new} = \frac{\pi}{N_{levels} - 1} = \frac{\pi}{2 \cdot N},$$

wherein N is the number of cells of one phase, and $N_{levels}$ is the number of line-neutral voltage states of the multilevel converter.

3. The method of claim 1, wherein each switching device comprises a rotating carrier signal that is a function of the plurality of carrier signals, and wherein a selected carrier signal corresponds to a band that is instantaneously occupied by the reference signal.

4. The method of claim 3, wherein the rotating carrier signal ($CR_n$) of each switching device is $$CR_n = \sum_{i,j,m} B_i \cdot K_j \cdot C_m, n = 1 \ldots 6,$$

wherein $B_i$ is a binary signal that is equal to 1 (one) or 0 (zero), $K_j$ is a coefficient having the value of −1 or 1, and $C_m$ corresponds to the carrier signals.

5. The method of claim 4, wherein $B_i$ is equal to 1 (one) when the reference signal is within band i, and is equal to 0 (zero) when the reference signals is outside band i, where i corresponds to the number of the plurality of contiguous bands.

6. The method of claim 1, wherein switching from a first carrier signal to a second carrier signal takes place at a crossing from a first band to a second band.

7. The method of claim 1, wherein the dynamically allocating of the plurality of carrier signals is performed by a finite state machine.

8. The method of claim 1, wherein the multilevel converter is configured as a cascaded H-bridge multilevel converter or a modular multilevel converter.

9. The method of claim 1, wherein the reference signal comprises a waveform that has a substantially sinusoidal shape.

10. The method of claim 1, wherein the plurality of carrier signals comprise a waveform having a substantially triangular shape.

11. A multilevel converter for producing a multiphase AC power supply, comprising:
a plurality of power cells for supplying power to one or more phases, each power cell comprising multiple switching devices incorporating semiconductor switches, and
a pulse width modulation controller connected to each of the power cells for controlling a voltage output of the plurality of power cells by controlling a switching event of each of the switching devices by pulse width modulation,
wherein the pulse width modulation controller is configured to
dynamically allocate a plurality of carrier signals to the multiple switching devices, and
generate pulse width modulation signals to generate switching events of the multiple switching devices based on a comparison of dynamically allocated carrier signals with a reference signal,
wherein the plurality of carrier signals comprises a phase shift between the carrier signals, and
wherein the plurality of carrier signals are dynamically allocated to the multiple switching devices such that for each switching device the plurality of carrier signals are rotated and selected based on a position of the reference signal with respect to the plurality of bands.

12. The multilevel converter of claim 11, wherein the multilevel converter is configured as cascaded H-bridge multilevel converter or modular multilevel converter.

13. The multilevel converter of claim 11, wherein the phase shift ($T_{shift\_phase\_new}$) between the carrier signals is $$T_{shift\_phase\_new} = \frac{\pi}{N_{levels} - 1} = \frac{\pi}{2 \cdot N},$$

wherein N is the number of cells of one phase, and $N_{levels}$ is the number of line-neutral voltage states of the multilevel converter.

14. The multilevel converter of claim 11, wherein the plurality of carrier signals are dynamically allocated utilizing a finite state machine in communication with the pulse width modulation controller.

15. The multilevel converter of claim 11, wherein an output of the multiphase AC power supply is connected to a load comprising an electric machine.

* * * * *